(12) United States Patent
Nomura et al.

(10) Patent No.: US 6,631,924 B2
(45) Date of Patent: Oct. 14, 2003

(54) SHOCK ABSORBING TYPE STEERING COLUMN APPARATUS

(75) Inventors: Tetsuo Nomura, Gunma-ken (JP); Kenji Satoh, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/939,567

(22) Filed: Aug. 28, 2001

(65) Prior Publication Data

US 2002/0024210 A1 Feb. 28, 2002

(30) Foreign Application Priority Data

Aug. 29, 2000 (JP) ........................................ 2000-259145

(51) Int. Cl.$^7$ ................................................. B62D 1/19
(52) U.S. Cl. ...................................................... 280/777
(58) Field of Search ............................ 280/777; 180/271; 188/371

(56) References Cited

FOREIGN PATENT DOCUMENTS

| DE | 195 42 491 | 2/1997 |
|---|---|---|
| DE | 198 29 237 | 1/1999 |
| EP | 1 018 463 | 7/2000 |
| EP | 1 101 687 | 5/2001 |
| GB | 2 340 457 | 2/2000 |
| GB | 2 350 328 | 11/2000 |
| GB | 2 350 329 | 11/2000 |
| GB | 2 350 333 | 11/2000 |
| JP | 46-35527 | 10/1971 |
| JP | 7-329796 | 12/1995 |
| WO | WO 98/22325 | 5/1998 |
| WO | WO 99/58389 | 11/1999 |

OTHER PUBLICATIONS

"Computer Controlled Energy Absorbing Steering Column For Automotive Use," *Research Disclosure*, vol. 2244, No. 359, Mar., 1994, pp. 158–159.

*Primary Examiner*—Paul N. Dickson
*Assistant Examiner*—Joselynn Y Sliteris
(74) *Attorney, Agent, or Firm*—Miles & Stockbridge P.C.

(57) ABSTRACT

A shock absorbing type steering column apparatus including a collision energy absorbing mechanism for absorbing a secondary collision energy of an occupant upon a collision of a vehicle, comprises an energy absorption quantity adjusting device for changing an absorption quantity of the secondary collision energy absorbed by the collision energy absorbing mechanism, at least one of operation state detecting sensors for detecting a state of the occupant or of the vehicle, a collision detecting sensor for detecting the collision of the vehicle, and an electric control device for controlling a drive of the energy absorption quantity adjusting device on the basis of a result of the detection by the operation state detecting sensor at the point of time when the collision detecting sensor detects the collision of the vehicle.

9 Claims, 13 Drawing Sheets

SHOCK ABSORBING TYPE STEERING COLUMN APPARATUS

This application claims the benefit of Japanese Patent Application No. 2000-259145 which is hereby incorporated by reference.

BACKGROUND OF THE INVENTION

1. Field of the Invention

The present invention relates generally to a shock absorbing type steering column apparatus, and more particularly to a technology of switching over a collapse load of a steering column when a collision happens.

2. Related Background Art

If an automobile collides with another automobile, a structure or the like, a driver might suffer from a secondary collision with a steering wheel by inertia. Automobiles produced over the recent years have widely adopted a shock absorbing type steering shaft and a shock absorbing type steering column apparatus in order to prevent the driver from being injured in such an accident. The shock absorbing type steering column apparatus has such a structure that when the driver suffers from the secondary collision, the steering column comes off together with the steering shaft and normally gets collapsed simultaneously with the steering shaft, thus absorbing a collision energy on that occasion. A known collision energy absorption system is a ball system in which, as disclosed in Japanese Patent Application Post-Exam Publication No. 46-35527, metal balls are interposed between the outer and inner columns, and plastic grooves are, when collapsed, formed in the inner peripheral surface of the outer column and in the outer peripheral surface of the inner column. Another known system is an drawing system in which the energy absorbing member such as a steel plate and so on is, as disclosed in Japanese Patent Application Laying-Open Publication No.7-329796, held by any one of the outer and inner columns, and the energy absorbing member is drawn by an drawing member such as a pin or the like held by the other column.

In the shock absorbing type steering column apparatus described above, the steering column, when a predetermined collapse load acts thereon, get collapsed. The following problem, however, arises in such apparatus. Normally, the collapse load is set based on a kinetic energy when a driver having a standard weight secondarily collides with the steering wheel at a predetermined velocity. If the driver is, for instance, a female or one of small stature, the kinetic energy thereof becomes, as a matter of course, small, and hence the steering column does not get collapsed even though this type of driver collides with the steering wheel at the same velocity. Then, the collision energy is not absolutely absorbed. As a result, the shock absorbing type steering column apparatus fails to perform its essential function, and the driver might receive a large impact on the breast and the head.

According to Great Britain Patent GB2340457A, there is proposed a system for addressing the problem described above, wherein a hydraulic cylinder type collision energy absorbing mechanism is provided, an electronic control unit calculates a target collapse load based on driving parameters outputted from a car speed sensor, a driver weight sensor and others, and a hydraulic fluid inflow resistance of the hydraulic cylinder is changed by adjusting an opening/closing quantity of an electrically-driven valve provided in a hydraulic circuit of the collision energy absorbing mechanism, thereby switching over the collapse load. In this system also, however, there is still a problem in terms of the timing when the electronic control unit calculates the target collapse load. For example, it is desirable that the target collapse load be calculated based on the driving parameters inputted from the respective sensors at the collision; however, this is impossible in the case of using the electrically-driven valve and an electromagnetic actuator. Specifically, the electrically-driven valve and an electromagnetic actuator require a comparatively long period of time for their operations finish once started. Hence, even when the drive current is inputted from the electronic control unit after the primary collision, it is unfeasible to switch over the collapse load in the extremely short period of time before the driver suffers from the secondary collision . Such being the case, as a matter of course, the electronic control unit previously switches over the collapse load before the collision. Because the respective driving parameters momentarily change corresponding to a driving condition, however,. a proper collapse load cannot be obtained.

SUMMARY OF THE INVENTION

It is a primary object of the present invention, which was devised under such circumstances, to provide a shock absorbing type steering column apparatus capable of switching over a collapse load of a steering column just when a collision happens and thereby absorbing an impact upon a secondary collision irrespective. of changes in kinetic energy of a driver.

To accomplish the above object, according to one aspect of the present invention, a shock absorbing type steering column apparatus including a collision energy absorbing mechanism for absorbing a secondary collision energy of an occupant upon a collision of a vehicle, comprises an energy absorption quantity adjusting device for changing an absorption quantity of the secondary collision energy absorbed by the collision energy absorbing mechanism, at least one of operation state detecting sensors for detecting a state of the occupant or of the vehicle, a collision detecting sensor for detecting the collision of the vehicle, and an electric control device for controlling a drive of the energy absorption quantity adjusting device on the basis of a result of the detection by the operation state detecting sensor at the point of time when the collision detecting sensor detects the collision of the vehicle.

According to the present invention, the electric control device calculates the kinetic energy based on a result of the detection by each of the operation state detecting devices immediately after the collision, then sets a target collapse load from mappings stored in a ROM or from an arithmetic formula, and outputs a drive current to an actuator of the energy absorption quantity adjusting device.

According to another aspect of the present invention, a shock absorbing type steering column apparatus including collision energy absorbing mechanism for absorbing a secondary collision energy of an occupant upon a collision of a vehicle, comprises an energy absorption quantity adjusting device for changing an absorption quantity of the secondary collision energy absorbed by the collision energy absorbing mechanism, wherein the energy absorption quantity adjusting device involves the use of a gas generated by a gas generating device as an operation source thereof.

According to the present invention, for instance, the electric control device outputs, when finishing the setting of the target collapse load, the electric current to an igniter of the electric ignition type gas generating device, and drives pins and a cylinder constituting the switching mechanism of

DETAILED DESCRIPTION OF THE PREFERRED EMBODIMENTS

A few embodiments of the present invention will hereinafter be described with reference to the accompanying drawings.

Figure 1:
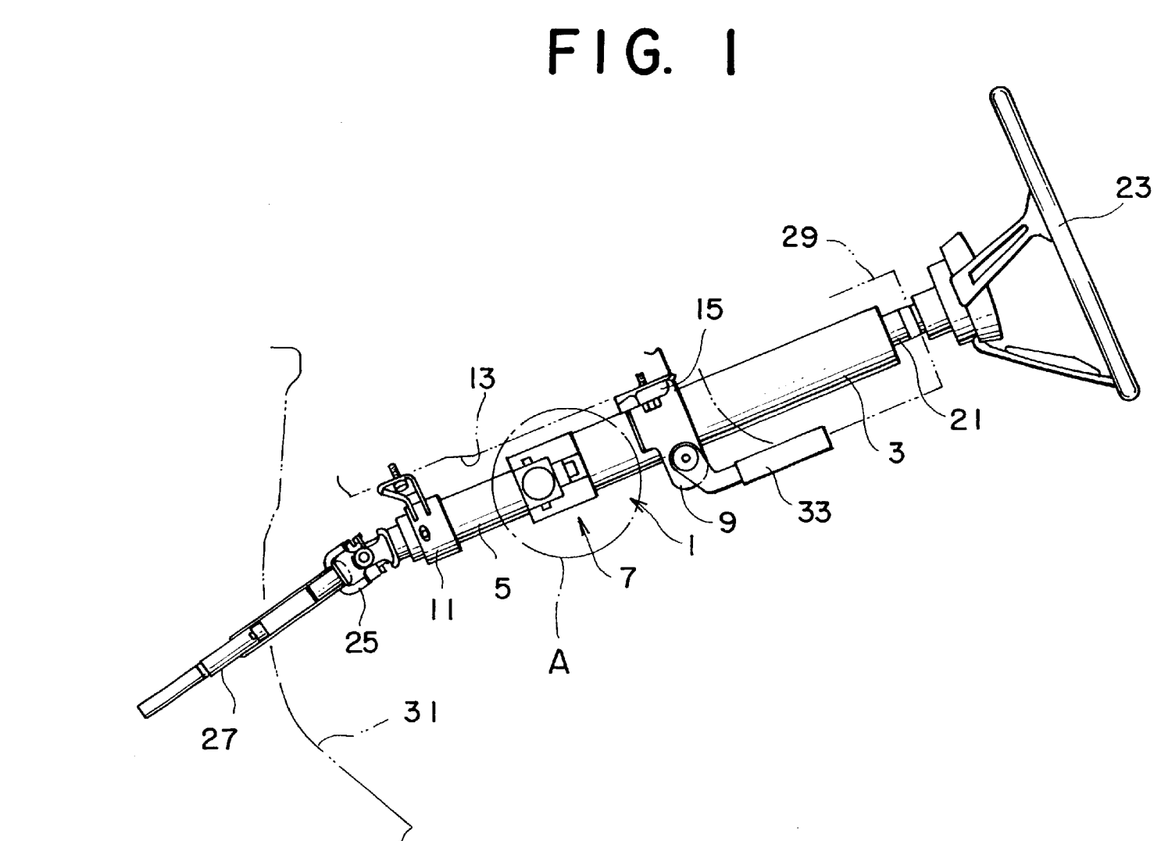
FIG. 1 is a side view showing a steering apparatus on the side of a car room in a first embodiment of the present invention.

FIG. 1 is a side view showing a steering apparatus on the side of a car passenger compartment in a first embodiment, wherein the reference numeral 1 represents a collapsible column. The collapsible column 1 is constructed of outer and inner columns 3, 5 each composed of a steel pipe, and a collision energy absorbing mechanism 7. The collapsible column 1 is attached to a car-sided member 13 via an upper column bracket 9 for holding the outer column 3 and a lower column bracket 11 for holding the inner column 5. Note that a capsule 15 made of an aluminum alloy is interposed between the upper column bracket 9 and the car structural member 13 in this embodiment. When an impact load having a predetermined or larger value acts, the upper column bracket 9 gets released forwards together with the outer column 3, however, a release mechanism other than the capsule type may also be adopted.

An upper steering shaft 21 is rotatably supported on the collapsible column 1 through unillustrated bearings. A steering wheel 23 is secured to an upper side end of the upper steering shaft 21. A lower steering shaft 27 is connected via a universal joint 25 to a lower side end of the shaft 21. FIG. 1 further illustrates a column cover 29 for covering an upper portion of the steering column 1, a firewall 31 for partitioning an engine compartment from the passenger compartment, and a tilt lever 33 used for tilt-adjusting the collapsible column 1. Note that the upper steering shaft 21 is provided with a known collision energy absorbing mechanism involving resin injection, serration elliptical fitting and so on. The collision energy absorbing mechanism absorbs a collision energy in a way that makes the shaft 21 collapse upon a secondary collision of a driver.

According to this steering apparatus, when the driver rotates the steering wheel 23, a rotating force thereof is transferred to an unillustrated steering gear via the upper steering shaft 21 and the lower steering shaft 27. The steering gear has a built-in rack and pinion mechanism for converting a rotational motion inputted into a rectilinear motion, and a steering angle of the dirigible wheels changes through a tie rod and so on, thus performing a steering operation. Note that there are a variety of known types of steering gears such as a ball screw type, a worm roller type etc. in addition to the rack and pinion type.

Figure 2:
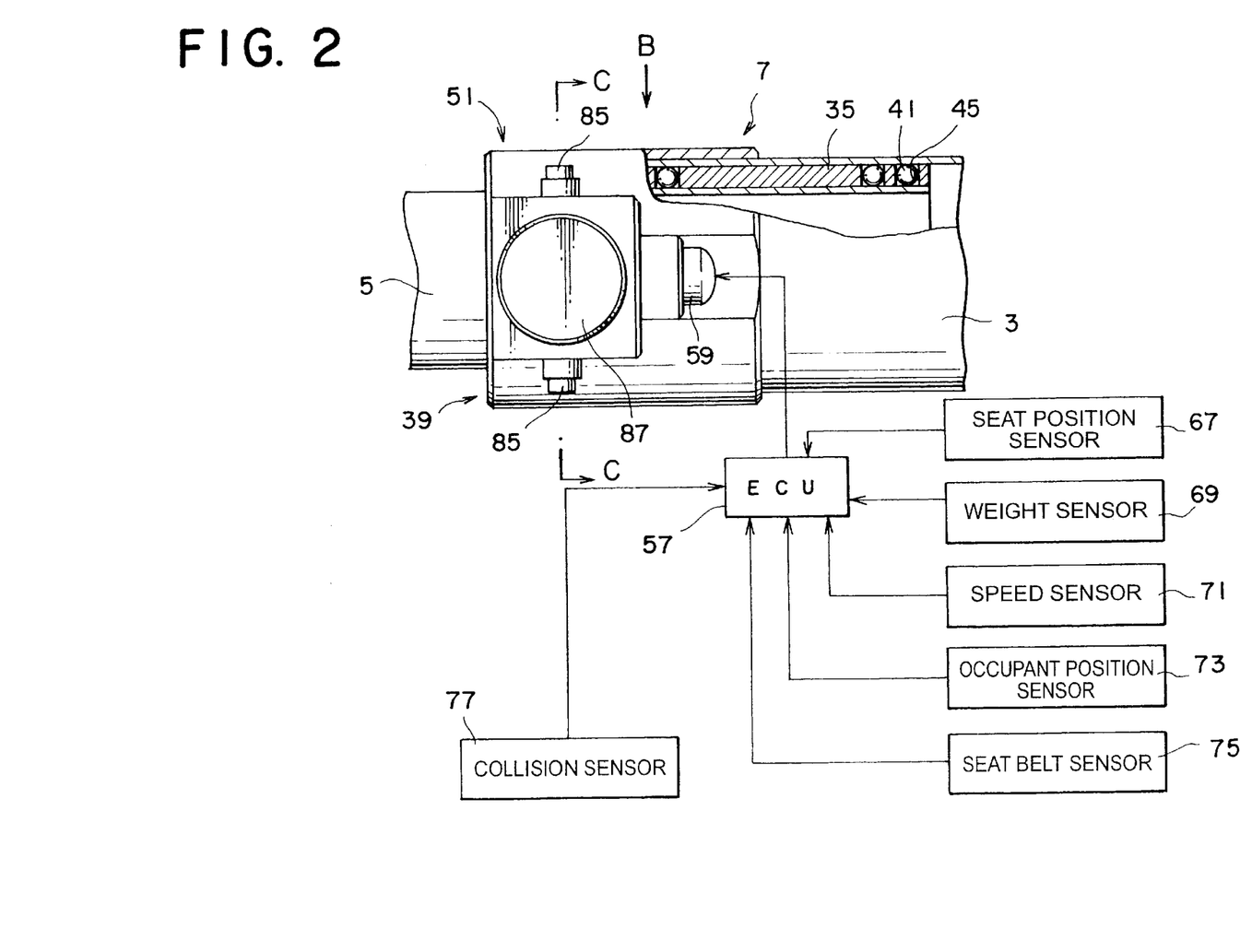
FIG. 2 is an enlarged view of the region A in FIG. 1.
Figure 3:
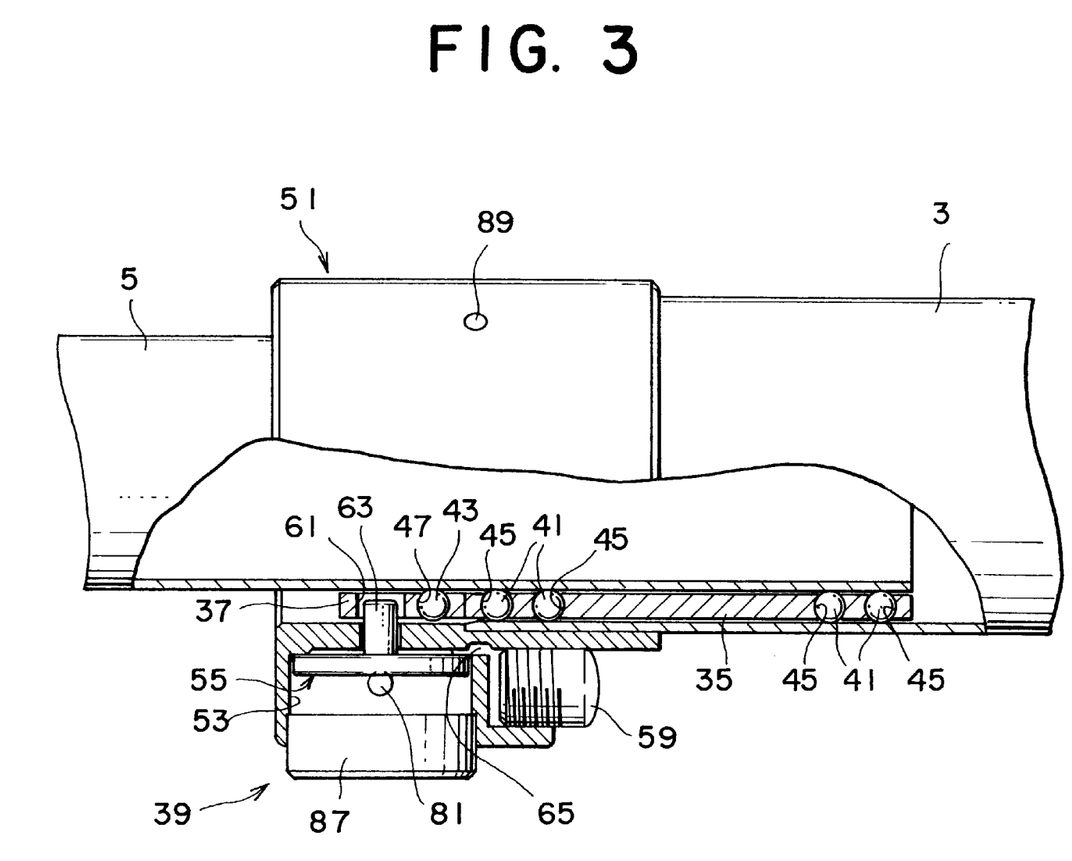
FIG. 3 is a view taken along the arrow line B in FIG. 2.
Figure 4:
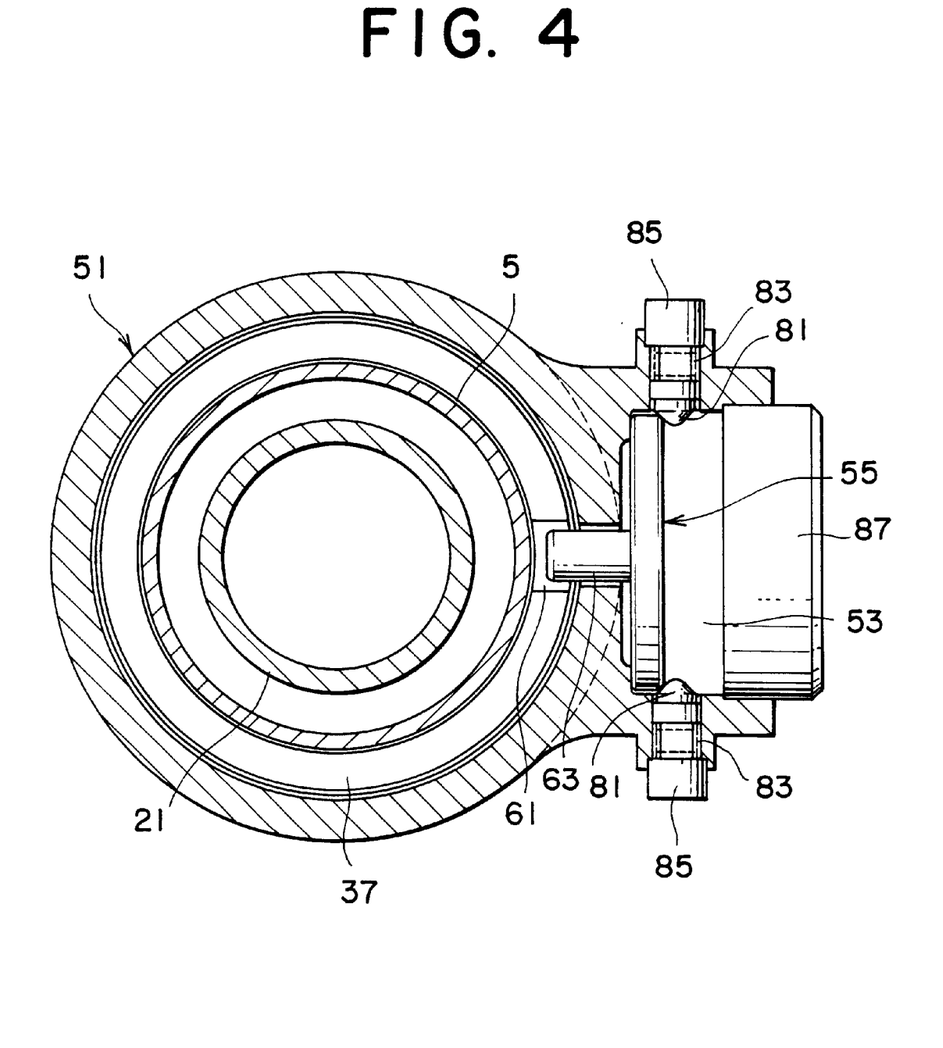
FIG. 4 is a sectional view taken along the line C—C in FIG. 2.

FIG. 2 is an enlarged view of the region A in FIG. 1. FIG. 3 is a view along the arrow B in FIG. 2. FIG. 4 is a sectional view taken along the line C—C in FIG. 2. As shown in these views, the collision energy absorbing mechanism 7 is mainly constructed of a first metal ball holding cylinder 35 interposed between the outer column 3 and the inner column 5, a second metal ball holding cylinder 37 disposed in front of the first metal ball holding cylinder 35, and a holding cylinder latching device 39 for latching the second metal ball holding cylinder 37.

Both of the first and second metal ball holding cylinders 35, 37 are composed of a synthetic resin, a sintered oil-retaining alloy and so on, and are respectively formed with steel ball holding holes 45, 47 for rotatably holding the steel balls 41, 43. According to this embodiment, the first and second metal ball holding cylinders 35, 37 are joined through unillustrated engagement pawls to each other by a predetermined engaging force, and may also be joined by use of resinous shearing pins etc.

A major diameter of each of the steel balls 41, 43 is set larger by a predetermined quantity than a gap between the outer column 3 and the inner column 5. When the outer and inner columns 3, 5 make relative movements in the axial direction, grooves are plastically formed in inner and outer peripheral surfaces of the two columns 3, 5. The steel ball holding hole 45 on the side of the first metal ball holding cylinder 35 and the steel ball holding hole 47 on the side of the second metal ball holding cylinder 37, are different in their angular phases in the rotating direction, and the two sets of steel balls 41, 43 plastically form the grooves in angular positions different from each other.

The holding cylinder latching device 39 is constructed of a housing 51 fixed to the outer column 3 and made of an aluminum alloy and a synthetic resin, a piston 55 slidably held by a cylinder 53 within the housing 51, and an electric ignition type gas generating device (which will hereinafter be called an inflator) 59, of which an ignition is controlled by an ECU (Electronic Control Unit) 57, screwed into a rear portion of the housing 51. The second metal ball holding cylinder 37 is formed with a through-hole 61. In a latched state shown in FIG. 3, a latching pin member 63 protruding from the center of the piston 55 is fitted into this through-hole 61. A reference numeral 65 represents a gas passageway formed in the housing 51, through which the inflator 59 communicates with a front side surface of the piston 55.

Connected to the ECU 57 are at least one of driving state detecting sensors such as a weight sensor 69, a car speed sensor 71, an occupant position sensor 73 and a seat belt wearing sensor 75 in addition to a seat position sensor 67, and a collision detecting sensor 77. A sensor used for an SRS (Supplemental Restraint System) airbag system etc. may be diverted to the collision detecting sensor 77, or a detection signal may also be received directly from the SRS airbag system. Further, a detection accuracy may also be enhanced by making use of a detection signal of detecting what state the driver is in (a state of the seat belt being worn or not, a weight and a position) and a detection signal of detecting a car speed in combination with the collision signal of the collision detecting sensor 77.

The housing 51 is fitted with a couple of movement preventive pins 81 of which cone-shaped front side ends engage with a rear surface of the piston 55, and a coil spring 83 for biasing each movement preventive pin 81 towards the piston 55, thereby keeping the piston 55 in an engaged state so as not to move carelessly. A member indicated by the numeral 85 in FIG. 4 is a plug for holding each coil spring 83, and a member indicated by the numeral 87 is a plug for preventing the piston 55 from coming off. These plugs 85, 87 are press-fitted and fixed to the housing 51.

According to the present embodiment, a positioning protrusion 89 (see FIG. 3) is formed on the housing 51. An inner side end of this positioning protrusion 89 fits in an engagement hole (not shown) formed in the outer column 3, thereby positioning the housing 51 with respect to the outer column 3 and preventing the housing 51 from rotating about this outer column 3. Note that the fixation of the housing 51 to the outer column 3 may involve a method of forming the housing 51 in a cylindrical shape so as to set a minor diameter of the housing 51 smaller by a predetermined quantity than a major diameter of the outer column 3, and then press-fitting the housing 51 to the outer column 3.

An operation in the first embodiment will hereinafter be described.

If the automobile collides with another automobile or an obstacle on the road during traveling, a collision signal from the collision detecting sensor 77 and a variety of driving state parameters given from the driving state detecting sensors 67, 69, 71, 73, 75, are inputted to the ECU 57. On this occasion, if a weight of the driver is comparatively large or if a car speed is high even though the weight of the driver is comparatively small, a kinetic energy of the driver produced upon collision increases. Therefore, the ECU 57 sets a target collapse load large on the basis of mappings stored in a ROM (Read-Only Memory) or a predetermined arithmetic formula, and supplies an ignition current to the inflator 59 of the holding cylinder latching device 39.

Figure 5:
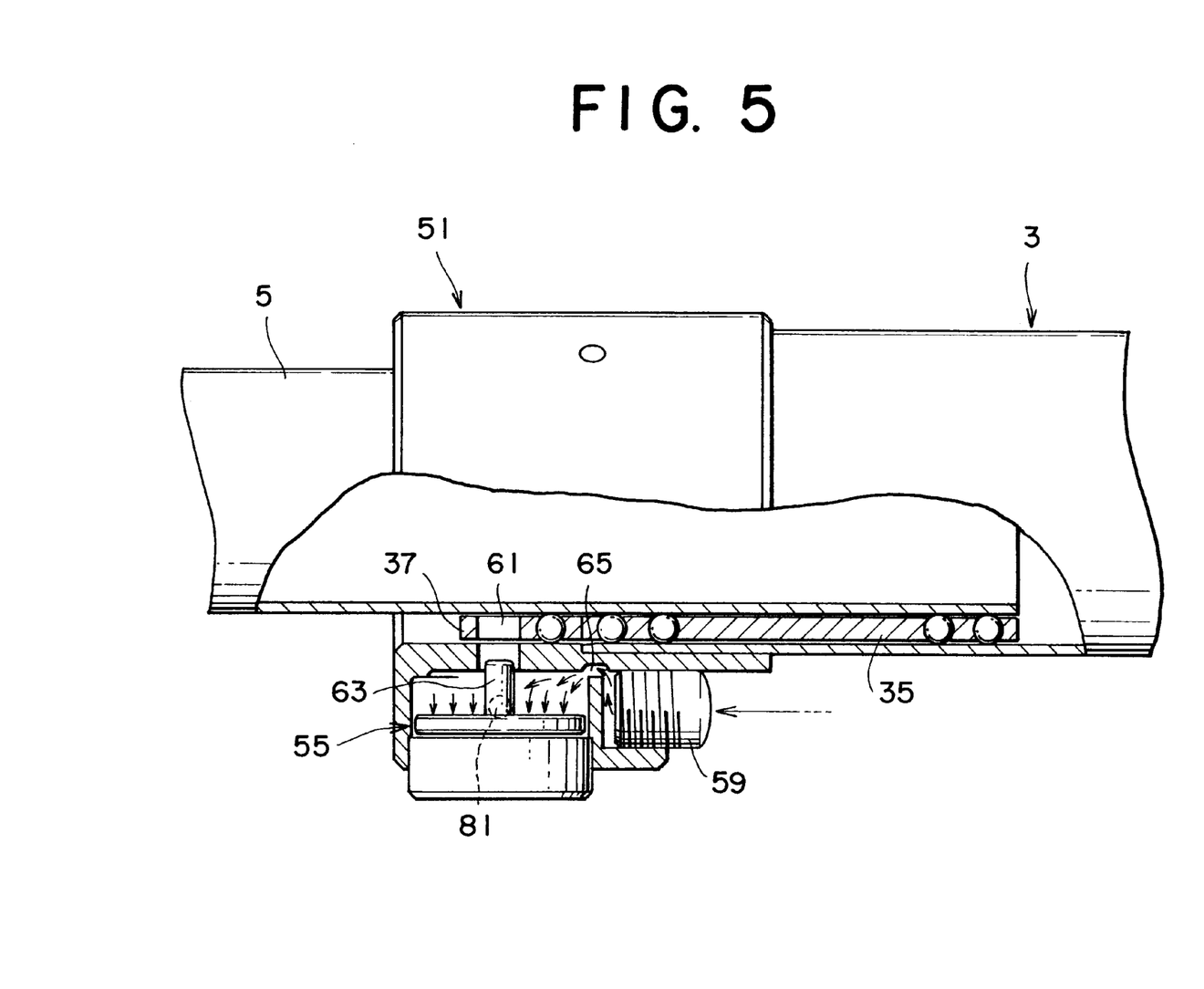
FIG. 5 is an explanatory diagram showing an operation of a holding cylinder engaging device when a collapse load is large.

When supplied with the ignition current from the ECU 57, the inflator 59 generates a large amount of nitrogen gas in an extremely short period of time, and the nitrogen gas flows through the gas passageway 65 and arrives at. the front side surface of the piston 55. Then, the piston 55, as illustrated in FIG. 5, pushes back the movement preventive pins 81 biased by the coil spring 83, and momentarily moves back, with the result that the latching pin member 63 of the piston 55 disengages from the through-hole 61 of the second metal ball holding cylinder 37 and comes into a released state.

Figure 6:
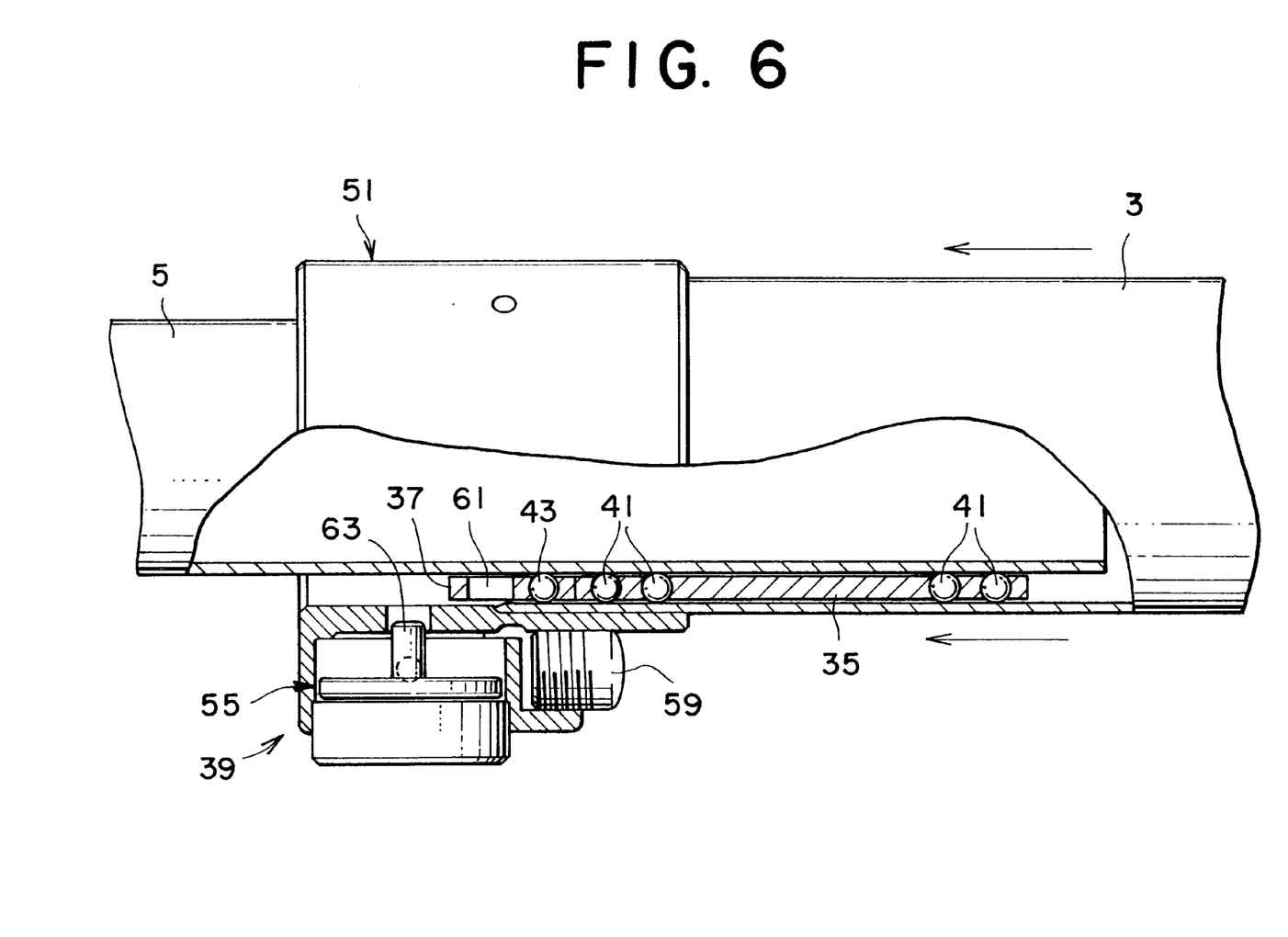
FIG. 6 is an explanatory diagram showing an operation of a collision energy absorbing mechanism when the collapse load is large.

On the other hand, upon the collision of the automobile, the driver suffers from a secondary collision with the steering wheel 23 by an inertia. This impact at first makes the upper column bracket 9 come off forward together with the outer column 3. Thereafter, the kinetic energy of the driver thrusts the steering wheel 23 forward, and, as shown in FIG. 6, the inner column 5 enters the outer column 3, whereby the collapsible column 1 starts getting collapsed. Note that the holding cylinder latching device 39 performs its operation in the extremely short period of time, and hence, at the point of time when the collapsible column 1 starts getting collapsed, the piston 55 is disengaged from the second metal ball holding cylinder 37 and comes into the released state.

Figure 7:
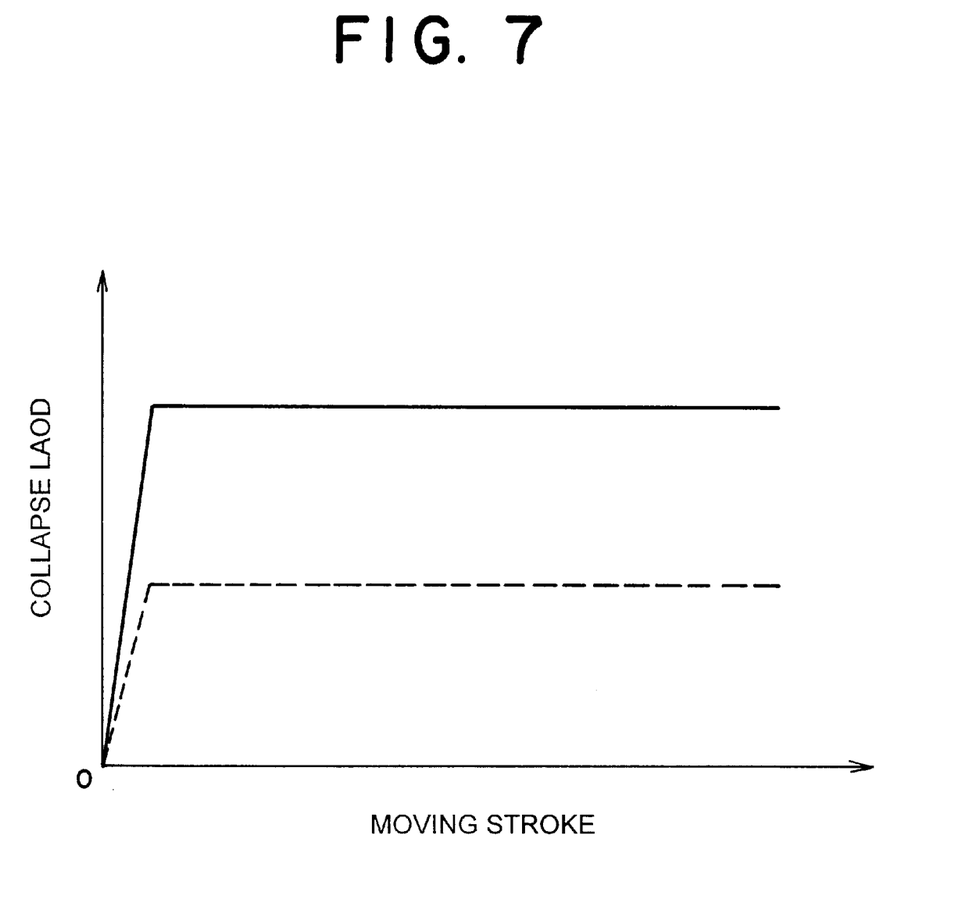
FIG. 7 is a graph showing a relationship between a moving stroke of an outer column and a collapse load.
Figure 8:
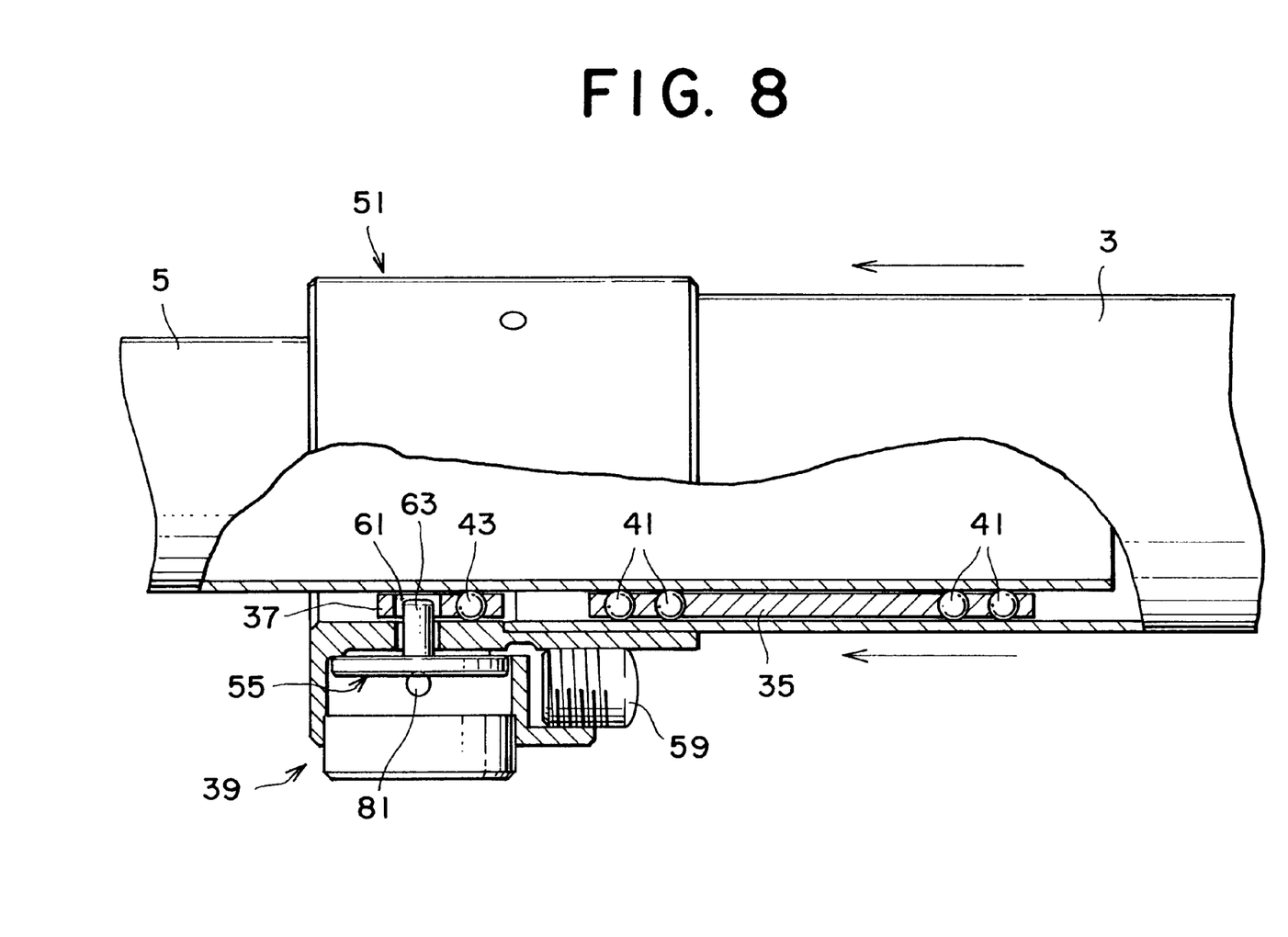
FIG. 8 is an explanatory diagram showing an operation of the collision energy absorbing mechanism when the collapse load is small.

When the collapsible column 1 starts getting collapsed, according to the first embodiment, the first and second metal ball holding cylinders 35, 37 which are joined to each other, integrally move forward between the outer and inner columns 3, 5 by half a movement quantity of the inner column 5. With this operation, the steel balls 41 on the side of the first metal ball holding cylinder 35 and the steel balls 43 on the side of the second metal ball holding cylinder 37, plastically form the respective grooves in the inner peripheral surface of the outer column 3 and in the outer peripheral surface of the inner column 5. Thus, an absorption of a comparatively large impact energy is realized. FIG. 7 is a graph showing a relationship between a moving stroke of the outer column 3 and a collapse load, wherein the solid line indicates a result of test on this occasion (when the collapse load is large).

Moreover, if the driver is a female or one of small stature with a comparatively small weight, the kinetic energy of the driver at the collision is comparatively small. Hence, the ECU 57 sets the target collapse load small and does not supply the ignition current to the inflator 59. Then, as shown in FIG. 3, the latching pin member 63 of the piston 55 remains engaged with the through-hole of the second metal ball holding cylinder 37.

In this latched state, if the driver secondarily collides with the steering wheel, in the same process as in the case described above, after the outer column has come off, the collapsible column 1 begins getting collapsed. On this occasion, the second metal ball holding cylinder 37 is impeded by the piston 55 and is therefore unable to move back together with the first metal ball holding cylinder 35 (the two lengths of metal ball holding cylinders 35, 37 get separated, overcoming the engaging force of the latching pawls etc.), with the result that grooves are plastically formed only by the steel balls 41 on the side of the first metal ball holding cylinder 35 and the absorption quantity of the impact energy becomes comparatively small. As a consequence, even if the driver is a female or one of small stature, the collapsible column 1 becomes smoothly collapsed, whereby it does not happen that large impact acts upon the breast and the head of the driver. The dotted line in FIG. 7 indicates a result of test on this occasion (when the collapse load is small), and it can be comprehended that the small collapse load is significantly decreased with respect to the large collapse load.

Figure 9:
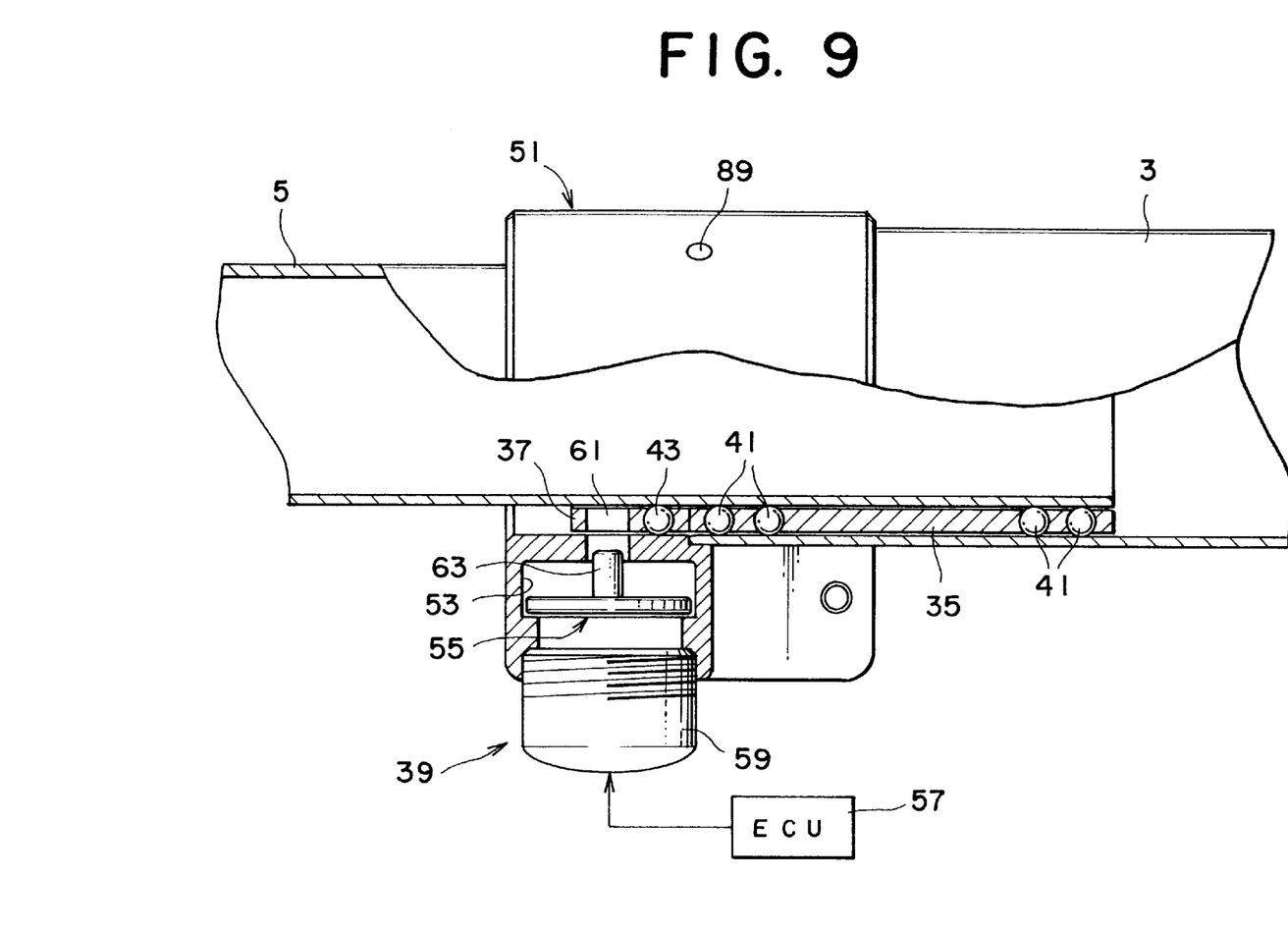
FIG. 9 is a side view showing principal portions of the steering apparatus in a second embodiment.

FIG. 9 is side view showing principal portions of the steering apparatus in a second embodiment of the present invention. The second embodiment takes substantially the same configuration as in the first embodiment discussed above; however, the construction of the holding cylinder latching device 39 is different. To be specific, an arrangement in the second embodiment, by contrast with the first embodiment, is that the piston 55 does not engage with the second metal ball holding cylinder 37 in the initial state, and, when the inflator 59 functions, a latching pin member 63 engages with a through-hole 61 with a forward movement of the piston 55. The operation in the second embodiment is substantially the same as in the first embodiment except that the ECU 57 supplies the ignition current to the inflator 59 when the collapse load is small.

Figure 10:
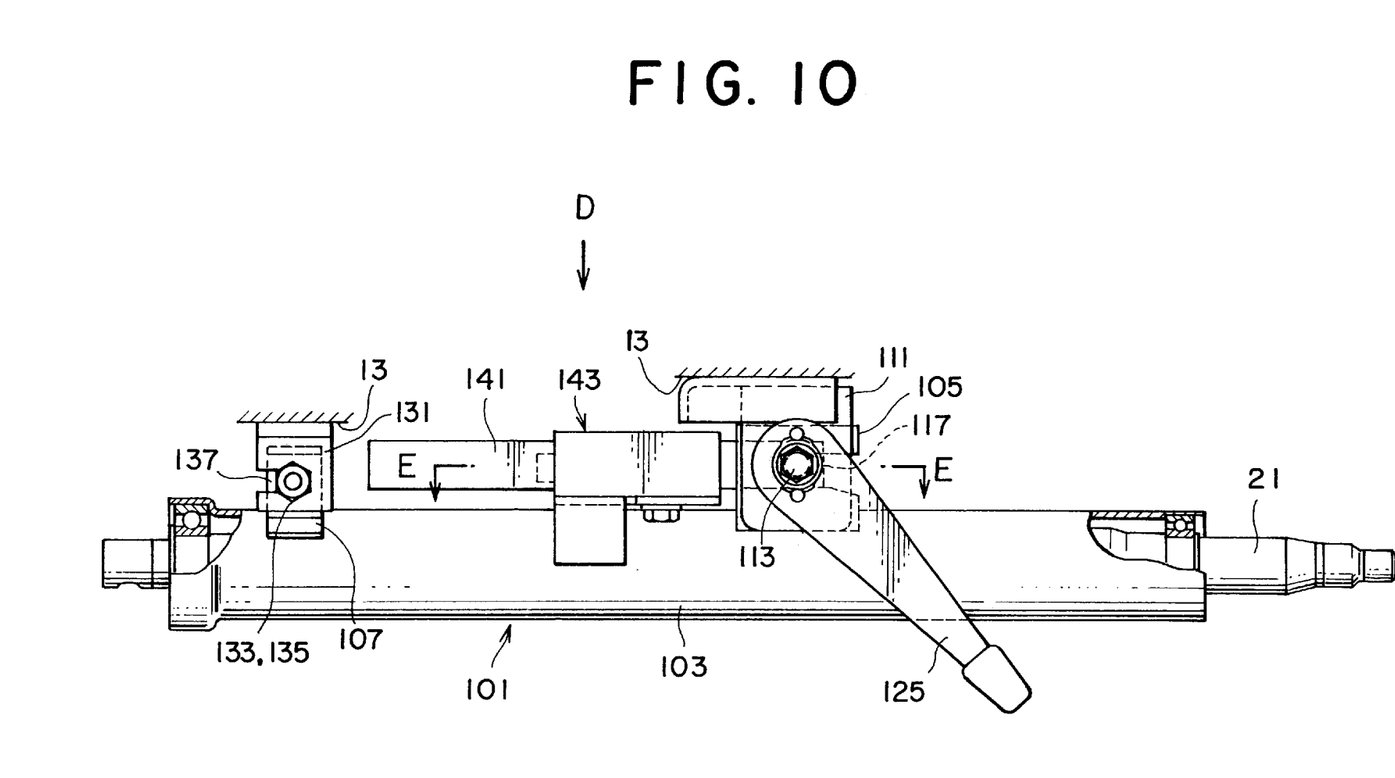
FIG. 10 is a side view showing the shock absorbing type steering column apparatus in a third embodiment.
Figure 11:
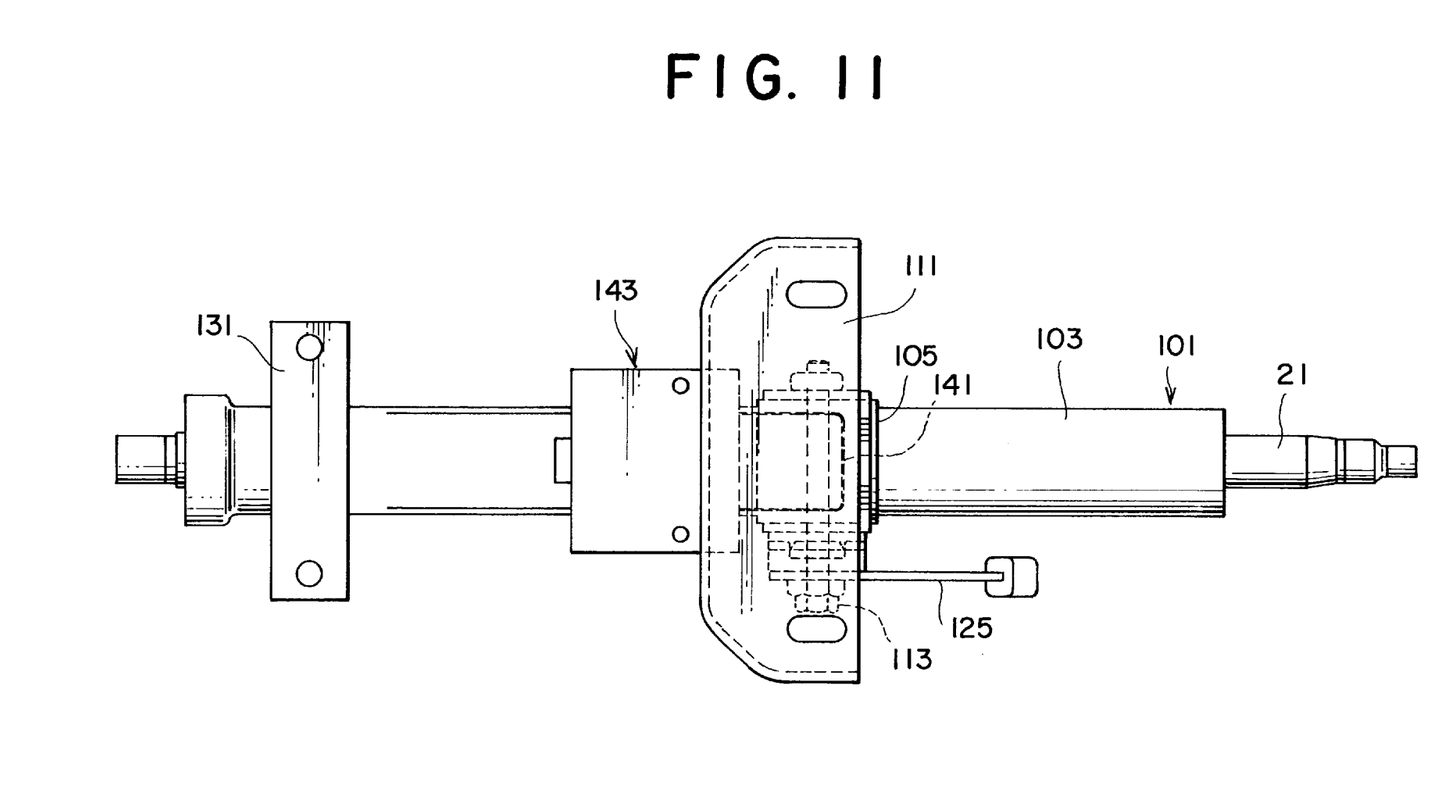
FIG. 11 is a view taken along the arrow line D in FIG. 10.

FIG. 10 is a side view showing the shock absorbing type steering column apparatus in a third embodiment of the present invention. FIG. 11 is a plan view (taken along the arrow line D in FIG. 10) showing the same apparatus. FIG.

Figure 12:
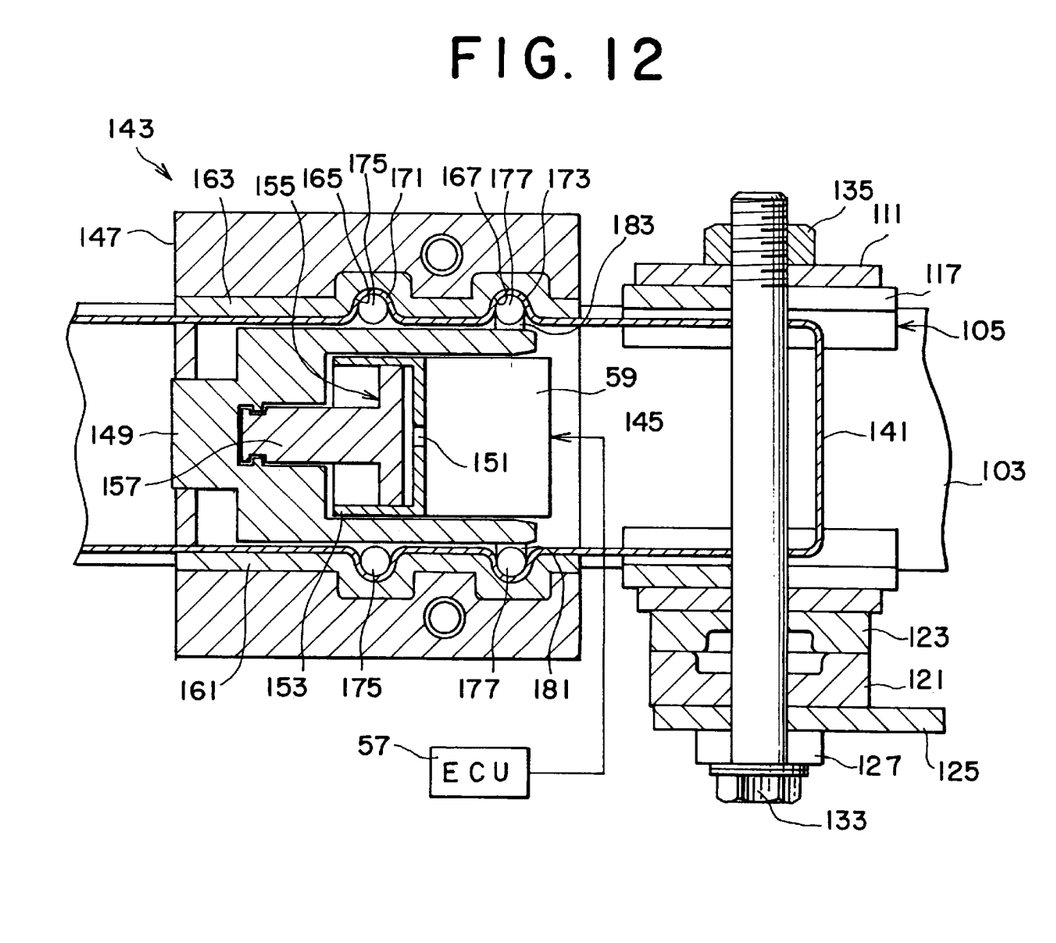
FIG. 12 is an enlarged sectional view taken along the line E—E in FIG. 10.

12 is an enlarged sectional view taken along the line E—E in FIG. 10. As shown in these drawings, a steering column 101 is manufactured in a way that joins by welding an upper distance bracket (which will hereinafter be simply called an upper bracket) 105 made of a steel plate to substantially a central portion of a column tube 103 made of a steel pipe by welding, and further joins by welding a lower distance bracket (which will hereinafter be simply called a lower bracket) 107 similarly made of a steel plate to a front side portion (a left side in FIGS. 10 and 11) thereof.

The upper bracket 105 is embraced by a tilt bracket 111 as a steel plate welding structural member fixed to the car-structural member 13, and fixedly fastened by a predetermined fastening force with a nut 115 and a tilt bolt 113 penetrating the tilt bracket 111. The upper bracket 105 is formed with a substantially U-shaped notch 117 opened backwards. The tilt bolt 113 is inserted into a front side end of this notch 117. Members designated at 121, 123 in FIG. 12 are known tilt cams used for fixing the steering column 101 at a predetermined angle. Further, a member indicated by 125 is a tilt lever for rotationally driving the tilt cam 121. A member with the numeral 127 is a thrust bearing interposed between the head of the tilt bolt 113 and the tilt lever 125.

On the other hand, the lower bracket 107 is embraced by a pivot bracket 131 manufactured as a casting, which fixed to the car-structural member 13. The lower bracket 107 is fixed with a nut 135 and a pivot bolt 133 penetrating the pivot bracket 131. The pivot bracket 131 is formed with a substantially U-shaped notch 137 opened forwards. The pivot bolt 133 is inserted into a rear side end of this notch 137. Note that the steering column 101 is swayable about the pivot bolt 133, and the driver can adjust up-and-down positions of the steering wheel 23 within a predetermined range by manipulating the tilt lever 125.

In accordance with the third embodiment, the collision energy absorbing mechanism is constructed of an energy absorbing plate 141 held by a tilt bolt 113 and a variable drawing device 143 fixed to the steering column 101. The energy absorbing plate 141 is a substantially U-shaped steel plate opened forwards, and the tilt bolt 113 penetrates the vicinity of its rear side end.

The variable drawing device 143 is, as shown in FIG. 12, a base plate 145 manufactured as a steel plate press molding that is welded to the column tube 103, a housing 147 fastened with a bolt to the base plate 145, a slide block 149 slidably held within the housing 147, an inflator 59 encased in the housing 147 and controlled in its ignition by the ECU 57, a cylinder 153 formed with a through-hole 151 communicating with the inflator 59, and a piston 155 slidably held within the cylinder 153.

The piston 155 has a rod member 157 protruding from at the center of its front side surface, and a front side end of the rod member 157 is engaged with and connected to the slide block 149. Note that at least one of driving state detecting sensors such as a weight sensor 69, a car speed sensor 71, an occupant position sensor 73 and a seat belt attaching sensor 75, and a collision detecting sensor 77 in addition to a seat position sensor 67, are connected to the ECU 57.

A couple of right and left guide plates 161, 163 are embraced by the housing 147 adjacently to the two side surfaces of the slide block 149. The energy absorbing plate 141 is inserted in between these guide plates 161, 163 and the slide block 149. The two guide plates 161, 163 include U-shaped recesses 165, 167 formed in inside areas of substantially central and rear portions thereof. Front and rear U-shaped bending portions 171, 173 formed on the energy absorbing plate 141 are fitted in those U-shaped recesses 165, 167.

With respect to the energy absorbing plate 141, fixed drawing pins 175 are fitted in the front U-shaped bending portions 171, while movable drawing pins 177 are fitted in the rear U-shaped bending portions 173. The housing 147 is formed with a couple of right and left elongate holes 181, 183 for receiving the movable drawing pins 177. The movable drawing pins 177 are movable bilaterally with a predetermined quantity within these elongate holes 181, 183.

An operation in the third embodiment will hereinafter be described.

According to the third embodiment, if the kinetic energy of the driver at the collision is large, the ECU 57 sets the target collapse load small and supplies no ignition current to the inflator 59. With this operation, the slide block 149 linked to the piston 155 remains backward, and a side surface of the rear portion of the slide block 149 is positioned inwardly of the movable drawing pins 177, thereby restricting an inward movement of the movable drawing pins 177.

In this state, if the driver suffers from the secondary collision with the steering wheel 23, with this impact, the upper bracket 105 get released forwards from the tilt bracket 111, and the lower bracket 107 gets released forwards from the pivot bracket 131, with the result that the steering column 101 comes off and starts moving forwards. Then, with the forward movement of the steering column 101, the movable drawing device 143 on the side of the steering column 101 advances with respect to the energy absorbing plate 141 secured by the tilt bolt 113 of the car structural member 13.

Then, in the energy absorbing plate 141, the front U-shaped bending portion 171 fitted in between the U-shaped recess 165 and the fixed drawing pins 175 and the rear U-shaped bending portion 173 fitted in between the U-shaped recess 167 and the movable drawing pins 177, move forward. As a result, the energy absorbing plate 141 is drawn in a way of its being wound sequentially on the two sets of drawing pins 175, 177 at four right and left portions, thereby realizing the absorption of a comparatively large collision energy.

Figure 13:
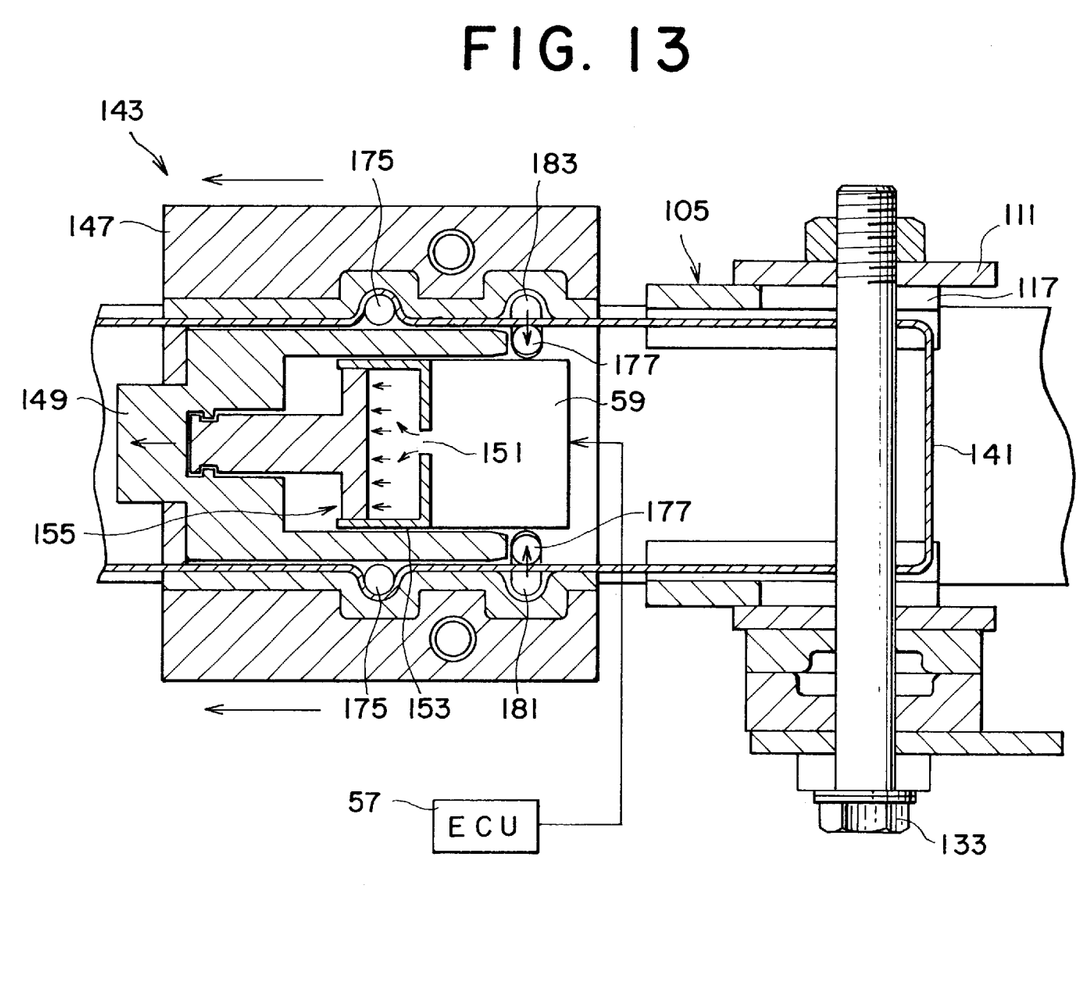
FIG. 13 is an explanatory diagram showing an operation a variable ironing device when the collapse load is small.

On the other hand, if the driver is a female or one of small stature with a comparatively small weight, the kinetic energy of the driver at the collision is comparatively small. Then, the ECU 57 supplies the ignition current to the inflator 59. When supplied with the ignition current from the ECU 57, the inflator 59 generates a large amount of nitrogen gas in an extremely short period of time. The nitrogen gas flows through a through-hole 151 of the cylinder 153 and arrives at the rear portion of the piston 155. This makes, as shown in FIG. 13, the piston 155 momentarily advance together with the slide block 149 and makes the movable drawing pins 177 movable with no hindrance within the elongate holes 181, 183.

In this state, if the automobile collides with another automobile or an obstacle on the road, in the same process as in the case described above, the steering column 101 comes off and moves forwards, and the variable drawing device 143 moves forwards with respect to the energy absorbing plate 141. In this case, however, the movable drawing pins 177 are not restrained by the slide block 149, and hence the rear U-shaped bending portion 173 of the energy absorbing plate 141, when advancing and getting released from the U-shaped recess 167, thrusts the movable pins 177 inwards and away.

As a result, the energy absorbing plate 141 is drawn only by the fixed drawing pins 175 at the two right and left portions, resulting in a decrease in the absorption quantity of the collision energy. Even when the driver is female or one of small stature, the steering column is smoothly moved forwards, whereby a large impact is applied upon neither the breast nor the head of the driver.

The discussions on the specific embodiments are thus complete, although it will be appreciated that the mode of the present invention is not limited to the embodiments discussed above. For example, according to the first embodiment, the collapse load is changed at the two stages by latching the second metal ball holding cylinder with the outer column through the piston, and separating the first and second metal ball holding cylinders from each other. The collapse load can be changed at three or more stages by providing a plurality of stages of the inflators, pistons and metal ball holding cylinders. In addition, the specific configurations of the steering column apparatus and the absorbed energy adjusting mechanism can be changed without departing from the concept and scope of the present invention.

As discussed above, according to a first aspect of the invention, the shock absorbing type steering column apparatus including the collision energy absorbing mechanism for absorbing the secondary collision energy of the occupant upon the collision of the vehicle, comprises the energy absorption quantity adjusting device for changing the absorption quantity of the secondary collision energy absorbed by the collision energy absorbing mechanism, at least one of the operation state detecting sensors for detecting the state of the occupant or of the vehicle, the collision detecting sensor for detecting the collision of the vehicle, and the electric control unit for controlling a drive of the energy absorption quantity adjusting device on the basis of the result of the detection by the operation state detecting sensor at the point of time when the collision detecting sensor detects the collision of the vehicle. Therefore, for instance, the kinetic energy is calculated based on the result of the detection by each of the operation state detecting devices immediately after the collision. Then, the target collapse load is set from the mappings stored in the ROM or from the arithmetic formula, and the drive current is outputted to the actuator of the energy absorption quantity adjusting device, whereby the proper collapse load at the collision can be obtained.

Further, according to a second aspect of the second invention, the shock absorbing type steering column apparatus including the collision energy absorbing mechanism for absorbing the secondary collision energy of the occupant upon the collision of the vehicle, comprises the energy absorption quantity adjusting device for changing the absorption quantity of the secondary collision energy absorbed by the collision energy absorbing mechanism, at least one of the operation state detecting sensors for detecting the state of the occupant or of the vehicle, and the electric control unit for controlling a drive of the energy absorption quantity adjusting device on the basis of the result of the detection by the operation state detecting sensor. The energy absorption quantity adjusting device involves the use of a gas generated by an electric ignition type gas generating device as an operation source thereof. Hence, the electric control device outputs the electric current to an igniter of the electric ignition type gas generating device, and the piston and others constituting the switching mechanism of the collapse load are driven by the gas generated by this gas generating device, thereby immediately switching over the collapse load and making it possible to set an optimal collapse load after the collision.

What is claimed is:

1. A shock absorbing type steering column apparatus for a vehicle, comprising:
   a collision sensor which detects a collision of the vehicle;
   a detecting system which detects information relating to an amount of secondary collision energy;
   an electric controller which issues a signal based on the information from said detecting system when said collision sensor detects the collision of the vehicle;
   an energy absorbing mechanism which takes one of an operative state in which, upon a secondary collision, the energy absorbing mechanism allows a relative movement between a steering wheel and a vehicle body structural member while resisting said relative movement so as to absorb energy of the secondary collision, and a non-operative state in which the energy absorbing mechanism is not operative; and
   an actuator device which changes over said energy absorbing mechanism from said one state to the other state upon receipt of said signal from said electric controller.

2. A shock absorbing type steering column apparatus for a vehicle, comprising:
   a collision sensor which detects a collision of the vehicle;
   a detecting system which detects information relating to an amount of secondary collision energy to be applied to an occupant;
   an electric controller which issues a signal based on the information from said detecting system when said collision sensor detects the collision of the vehicle;
   a first energy absorbing mechanism which takes one of an operative state in which, upon a secondary collision, the first energy absorbing mechanism allows a relative movement between a steering wheel and a vehicle body structural member while collapsing to resist said relative movement so as to absorb energy of said secondary collision, and a non-operative state in which the first energy absorbing mechanism is not operative;
   a second energy absorbing mechanism which absorbs energy of the secondary collision upon the collision of the vehicle; and
   an actuator device which changes over said first energy absorbing mechanism from said one state to the other state upon receipt of said signal from said electric controller.

3. A shock absorbing type steering column apparatus according to claim 2, wherein said detecting system detects at least one of a state of the occupant and a state of the vehicle.

4. A shock absorbing type steering column apparatus according to claim 2, wherein said actuator device includes a gas generating device which generates gas upon receipt of said signal from said electric controller, and an actuator which is driven by said gas to change over said first energy absorbing mechanism from said one state to the other state.

5. A shock absorbing type steering column apparatus according to claim 2, wherein said steering column apparatus includes a lower column and an upper column which is movable relative to said lower column upon the secondary collision, and each of said first and second energy absorbing mechanisms includes a portion disposed between said lower column and said upper column and includes a plastically deformable member which is plastically deformed upon the relative movement.

6. A shock absorbing type steering column apparatus according to claim 1, wherein said steering column apparatus includes a column assembly held to a vehicle body structural member relatively movably upon the secondary collision, and each of said first and second energy absorbing mechanism includes a portion disposed between said vehicle body structural member and said column assembly and includes a plastically deformable member which is plastically deformed upon the movement of the column assembly relative to the vehicle body structural member.

7. A shock absorbing type steering column apparatus according to claim 1, wherein said second energy absorbing mechanism is operative to absorb secondary collision energy regardless of the state of said first energy absorbing mechanism.

8. A shock absorbing type steering column apparatus according to claim 3, wherein said detecting system includes at least one of a seat position sensor, a weight sensor, an occupant position sensor, and a seat belt sensor.

9. A shock absorbing type steering column apparatus according to claim 2, wherein said first energy absorbing mechanism includes a deformable plate which is deformed to absorb energy of said secondary collision.

* * * * *